United States Patent [19]
Geschke et al.

[11] Patent Number: 5,661,651
[45] Date of Patent: Aug. 26, 1997

[54] WIRELESS VEHICLE PARAMETER MONITORING SYSTEM

[75] Inventors: James R. Geschke; Kurt A. Dykema, both of Holland, Mich.

[73] Assignee: Prince Corporation, Holland, Mich.

[21] Appl. No.: 414,525

[22] Filed: Mar. 31, 1995

[51] Int. Cl.[6] ................................................. B60K 31/00
[52] U.S. Cl. ....................................................... 364/424.034
[58] Field of Search ........................ 364/424.03, 424.034, 364/424.036, 424.038, 424.045; 340/442, 447, 825.22, 58; 123/335; 73/146.5

[56] References Cited

U.S. PATENT DOCUMENTS

| | | | |
|---|---|---|---|
| 4,363,020 | 12/1982 | Venema | 340/58 |
| 4,376,931 | 3/1983 | Komatu et al. | 340/58 |
| 4,578,992 | 4/1986 | Galasko et al. | 73/146.5 |
| 4,588,978 | 5/1986 | Allen | 340/58 |
| 4,695,823 | 9/1987 | Vernon | 340/58 |
| 4,717,905 | 1/1988 | Morrison, Jr. et al. | 340/58 |
| 4,905,279 | 2/1990 | Nishio | 380/9 |
| 5,113,821 | 5/1992 | Fukui et al. | 123/335 |
| 5,136,548 | 8/1992 | Claar et al. | 367/2 |
| 5,181,423 | 1/1993 | Philipps et al. | 73/724 |
| 5,227,780 | 7/1993 | Tigwell | 340/825.22 |
| 5,285,189 | 2/1994 | Nowicki et al. | |
| 5,379,453 | 1/1995 | Tigwell | |
| 5,381,138 | 1/1995 | Stair et al. | 340/825.22 |
| 5,463,374 | 10/1995 | Mendez et al. | 340/442 |
| 5,469,136 | 11/1995 | Matsubara et al. | |
| 5,475,366 | 12/1995 | Van Lente et al. | 340/525 |
| 5,479,155 | 12/1995 | Zeinstra et al. | 340/825.22 |
| 5,483,827 | 1/1996 | Kulka et al. | 73/146.5 |
| 5,500,065 | 3/1996 | Koch et al. | 156/123 |
| 5,540,092 | 7/1996 | Handfield et al. | 73/146.5 |
| 5,541,574 | 7/1996 | Lowe et al. | 340/447 |
| 5,559,484 | 9/1996 | Nowicki et al. | 340/447 |
| 5,581,023 | 12/1996 | Handfield et al. | 73/146.5 |

FOREIGN PATENT DOCUMENTS 9402920  2/1994  WIPO.

OTHER PUBLICATIONS

Gail Marino, Pager and Garage Door Combination, Mar. 1990, Motorola Technical Developments, vol. 10, p. 36 (1 page).

Primary Examiner—Kevin J. Teska
Assistant Examiner—Stephen J. Walder, Jr.
Attorney, Agent, or Firm—Price, Heneveld, Cooper, DeWitt & Litton

[57] ABSTRACT

A wireless system for monitoring vehicle parameters, such as tire pressure, using radio frequency (RF) signals transmitted from transmitters close in proximity to an associated parameter sensor, to a centrally located receiver. The transmitted RF signals from the transmitters may be distinguished by the frequency of the respective transmitted RF signals. To detect the presence of an RF signal having a particular frequency, the wireless vehicle parameter monitoring system of one embodiment includes a digitally controlled tuner or a plurality of parallel bandpass filters, which pass different ranges of frequencies corresponding to the frequencies of the RF signals output from the transmitters. In this manner, RF signals transmitted from different tires may be distinguished based upon the frequency of the transmitted signal. The receiver of this system may be implemented in the receiver of a trainable transmitter such that a dedicated receiver need not be provided.

44 Claims, 6 Drawing Sheets

WIRELESS VEHICLE PARAMETER MONITORING SYSTEM

BACKGROUND OF THE INVENTION

The present invention relates to a vehicle parameter monitoring system and particularly a tire pressure monitoring system using radio frequency signals to communicate the detected tire pressure from the tires to a message center of the vehicle.

Excessive tire wear resulting in premature tire failure frequently results from under inflation of tires. Recent advances in tire manufacturing technology have produced tires that may be used for several miles at extremely low pressures without notice by the vehicle operator. Further, when such tires are at low pressure, the tires are not to be used above specified speeds. Thus, because a vehicle operator may not realize that a tire is nearly flat, these advances have increased the need for a system capable of monitoring tire pressures and warning a vehicle operator when the tire pressure is low.

In order to sense the pressure inside a tire, tire pressure monitoring systems utilize a pressure sensor located within the tire. The difficulty in implementing such systems is determining how to communicate the output of the pressure sensor located within a rotating tire to a warning display typically located in a fixed position in the vehicle's interior.

U.S. Pat. No. 5,285,189 discloses a tire pressure monitoring system that provides one solution to the above problem by utilizing radio frequency (RF) signals transmitted from transmitters located within the tires to a dedicated external receiver. In such systems, the transmitters typically include microcontrollers coupled to the pressure sensors for generating and transmitting encoded radio signals at the same carrier frequency. The encoded radio signals include tire pressure information and transmitter device identification information, which is useful for identifying from which tire the tire pressure information is transmitted. The receiver of this system receives the encoded radio signal and decodes the transmitted information to provide the vehicle operator an alarm if low tire pressure is detected.

One problem with the above-described system is the excessive cost involved in implementing such a system in a vehicle. Further, by placing separate microcontrollers in each tire, not only are the energy demands for the tire-mounted sensor increased, but the potential for damage to the sensor is also increased.

SUMMARY OF THE INVENTION

The present invention overcomes the above problems by providing a parameter monitoring system that permits reliable monitoring of tire pressure in each of the vehicle's tires utilizing a wireless RF link. Another aspect of the present invention is to provide a vehicle parameter monitoring system capable of monitoring several different types of vehicle parameters, such as tire pressure, fuel level, engine temperature, etc.

Still another aspect of the present invention is to provide a vehicle parameter monitoring system that is reliable and low in cost. An additional aspect of the present invention is to provide a vehicle parameter monitoring system that may determine which vehicle parameter is associated with a received RF signal. Yet another aspect of the present invention is to provide a tire pressure monitoring system using a wireless RF link that is capable of determining with which tire a received RF signal is associated. A further aspect of the vehicle parameter monitoring system of the present invention is that it includes parameter sensors capable of transmitting an RF signal indicative of a sensed level of the parameter (i.e., tire pressure).

A preferred embodiment of the present invention is implemented in a trainable transmitter of a vehicle without requiring a costly and space consuming separate dedicated receiver. Still another aspect of the present invention is that it may be used to govern the speed of the vehicle when an abnormally low tire pressure is detected.

To achieve these and other advantages, and in accordance with the purpose of the invention as embodied and described herein, the vehicle parameter monitoring system of the present invention includes at least one parameter sensor, at least one transmitter coupled to the parameter sensor for transmitting a radio frequency signal, and a receiver for receiving the radio frequency signal. The radio frequency signal has a frequency that is a function of the condition of a sensed parameter. The receiver includes a control circuit for detecting the frequency of the received radio frequency signal and for selecting and generating a message signal based upon the detected frequency of the received radio frequency signal.

These and other features, objects, and advantages of the invention may be realized and obtained by means of the instrumentalities and combinations particularly pointed out in the written description and claims hereof, as well as by the appended drawings.

DESCRIPTION OF THE PREFERRED EMBODIMENTS

Figure 1:
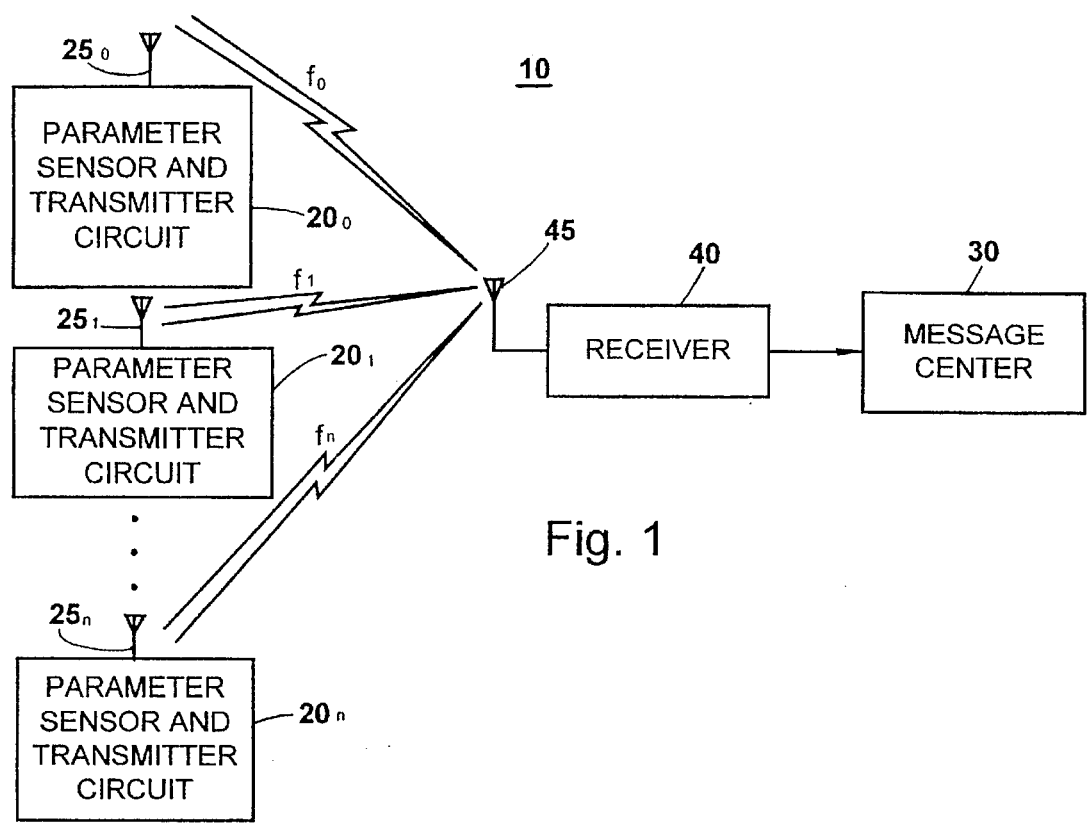
FIG. 1 is a block electrical circuit diagram of the wireless vehicle parameter monitoring system of the present invention.

The wireless vehicle parameter monitoring system of the present invention 10 is shown in FIG. 1 and includes at least one parameter sensor and transmitter circuit, but preferably a number "n" of such circuits identified as $20_0, 20_1, \ldots 20_n$. Each circuit 20 has an associated antenna ($20_0, 20_1, \ldots 20_n$). The system includes a receiving antenna 45 coupled to the vehicle's receiver 40, in turn leaving an output coupled to a vehicle message center 30 for displaying information received by receiver 40 from the parameter transmitters 20 to the vehicle operator.

Each of parameter sensor and transmitter circuits $20_0$–$20_n$ transmit an RF signal having a carrier frequency failing within at least one predefined frequency range centered at or about nominal frequencies $f_0, f_1, \ldots f_n$. As will be discussed further below, each of the respective frequencies $f_0$-$f_n$ may be the same or different nominal frequencies. Message center 30 may consist of an indicator light, a display, or an audible signal generator. Alternatively, message center 30 may include a microcontroller connected to various indicator lights, gauges, audible warning generators, a voice synthesizer, and/or a display for displaying alpha-numeric information to the vehicle operator.

Figure 2:
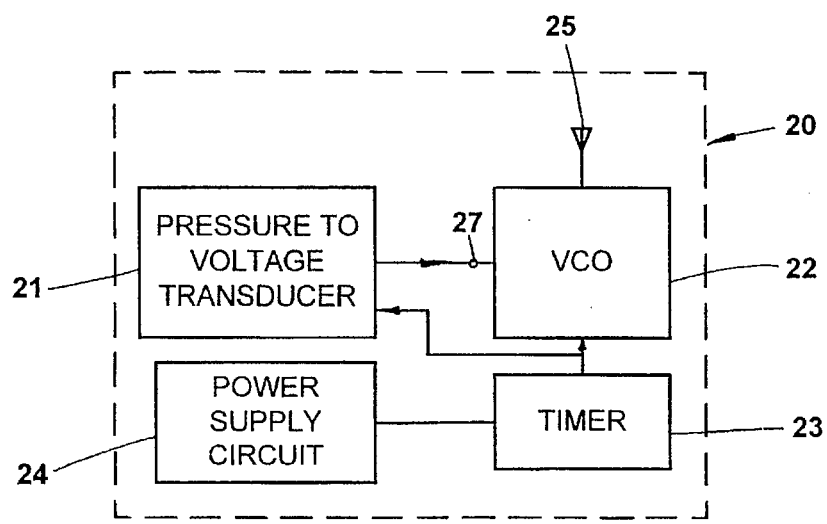
FIG. 2 is a block electrical circuit diagram of a parameter sensor and transmitter circuit constructed in accordance with the present invention.

FIG. 2 shows the preferred structure for a parameter sensor and transmitter circuit 20 when used to monitor the pressure inside a vehicle's tire. Parameter sensor and transmitter circuit 20 includes a pressure-to-voltage transducer 21, a voltage controlled oscillator (VCO) 22, a timer 23, and a power supply circuit 24. Pressure-to-voltage transducer 21 senses the pressure inside the tire and generates an output signal having a variable D.C. voltage proportional to the sensed tire pressure. VCO 22 receives the generated output signal from pressure-to-voltage transducer 21 at a control input terminal 27, and generates an RF signal having a frequency proportional to the voltage of the output signal generated by pressure-to-voltage transducer 21. VCO 22 supplies this RF signal to antenna 25 for transmission to receiver 40. To conserve power, parameter sensor and transmitter circuit 20 preferably includes timer 23, which receives power from a power supply circuit 24 and provides a periodic enabling signal to pressure-to-voltage transducer 21 and VCO 22 such that VCO 22 only generates the RF signal at periodic intervals. Power supply circuit 24 is preferably constructed in accordance with the teachings of U.S. Pat. No. 5,285,189, the disclosure of which is incorporated herein by reference.

Figure 3:
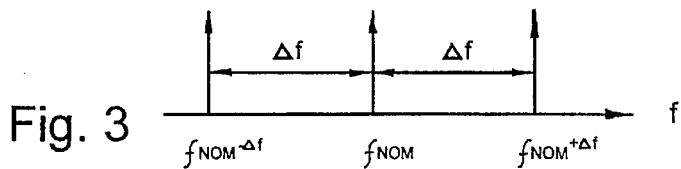
FIG. 3 is a graph illustrating a range of frequencies over which a parameter sensor and transmitter circuit constructed in accordance with the present invention may transmit.

FIG. 3 illustrates the range of frequencies of the RF signal output from parameter sensor and transmitter circuit 20 that would indicate when the tire pressure is less than adequate. For example, the frequency $f_{NOM}+\Delta f$ shown in FIG. 3 may represent an adequate tire pressure, and the frequency $f_{NOM}-\Delta f$ may represent a tire pressure that is extremely low. The nominal frequency $f_{NOM}$ is a frequency half-way between the frequency representing adequate tire pressure and the frequency representing the extremely low tire pressure. When the sensed tire pressure is more than adequate, parameter sensor and transmitter circuit 20 will transmit an RF signal having a carrier frequency greater than $f_{NOM}+\Delta f$.

Figure 4:
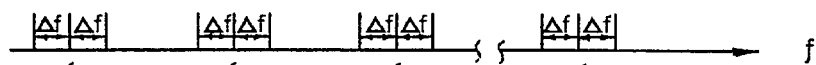
FIG. 4 is a graph illustrating the ranges of frequencies over which a plurality of parameter sensor and transmitter circuits constructed in accordance with the present invention may transmit.

When a plurality of parameter sensor and transmitter circuits $20_0$–$20_n$ are utilized, receiver 40 distinguishes the RF signals transmitted by the plurality of parameter sensor and transmitter circuits based upon the frequencies of the respective RF signals. When the system utilizes different nominal frequencies, the ranges of frequencies for the received RF signals may appear as shown in FIG. 4 where a first parameter sensor and transmitter circuit $20_0$ may transmit an RF signal having a frequency falling within the range centered about a first nominal frequency $f_0$ and an nth parameter sensor and transmitter circuit $20_n$ may transmit an RF signal having a frequency falling within the range centered about an nth nominal frequency $f_n$. By having the parameter sensor and transmitter circuits $20_0$–$20_n$ transmitting RF signals in exclusive and different frequency ranges, the sensed parameter identification is possible and is detected by the receiver to provide appropriate signal information to the message center 30 (FIG. 1) which responds with messages associated with the various sensed parameters. This feature is particularly useful for distinguishing which of the vehicle's tires is low in pressure. Further, this feature permits various other types of vehicle parameters to be sensed and monitored using the system of the present invention.

Figure 5:
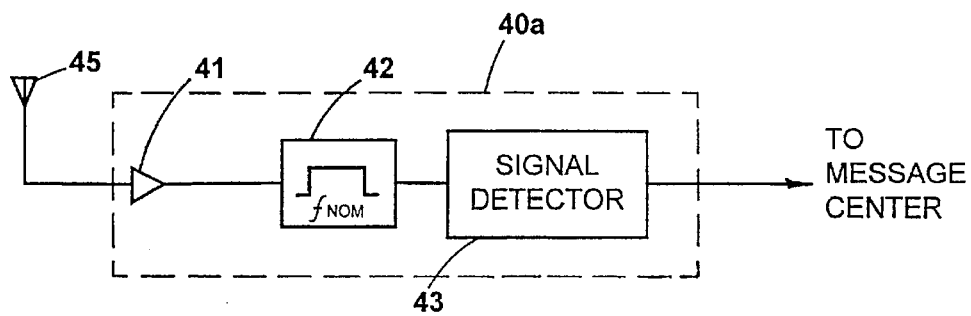
FIG. 5 is a block electrical circuit diagram of a receiver constructed in accordance with a first embodiment of the present invention.

FIG. 5 shows a example of a receiver 40a constructed in accordance with a first embodiment of the present invention. Receiver 40a includes an antenna 45, an RF amplifier 41 having an input coupled to antenna 45 and an output coupled to the input of a control circuit including a bandpass filter 42 and a signal detector 43. RF amplifier 41 receives the transmitted RF signal from antenna 45 and provides an amplified RF signal to bandpass filter 42. Preferably, bandpass filter 42 has a center frequency equal to the nominal frequency $f_{NOM}$ transmitted from at least one of parameter sensor and transmitter circuits $20_0$–$20_n$. Further, bandpass filter 42 preferably has a bandwidth of $2\Delta f$ corresponding to the range of frequencies that VCO 22 may output when a parameter level, such as the tire pressure, is low. With these preferred parameters, bandpass filter 42 will provide an output signal when at least one of parameter sensor and transmitter circuits $20_0$–$20_n$ transmit an RF signal having a frequency in the range shown in FIG. 3.

Signal detector 43 is a threshold detector which detects the presence of any signals output by bandpass filter 42 above a predetermined level indicating a signal falling within the bandpass of filter 42. Signal detector 43 provides a binary logic signal to message center 30 when it detects a signal. Signal detector 43 may include a capacitor connected in series with an RF diode sensitive to low current and a voltage comparator circuit. The RF diode and capacitor rectifies the RF signal passing through bandpass filter 42.

Receiver 40a advantageously is an inexpensive receiver that is fully capable of determining when a vehicle parameter is at an abnormal level based upon the frequency at which the associated parameter sensor and transmitter circuit transmits. In the context of a tire pressure monitoring system, receiver 40a provides an output signal to message center 30 indicating that at least one of the vehicle's tires is low in pressure provided each of parameter sensor and transmitter circuits $20_0$–$20_n$ associated with the vehicle's tires transmit within frequency ranges centered about the same nominal frequency $f_{NOM}$ when tire pressure is low. Because receiver 40a does not distinguish or identify which of the tires is low in pressure, message center 30 may consist of a single indicator light located in a vehicle instrument panel.

Figure 6:
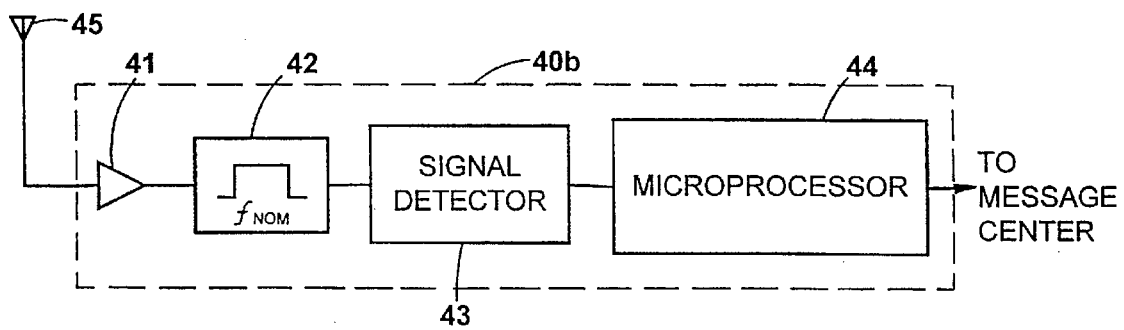
FIG. 6 is a block electrical circuit diagram of a receiver constructed in accordance with a second embodiment of the present invention.

A second embodiment of the invention will now be described with reference to FIG. 6 where like or similar parts are identified throughout this and the remaining drawings by the same reference number. Receiver 40b as shown in FIG. 6 differs from receiver 40a as shown in FIG. 5 in that the control circuit of receiver 40b additionally includes a microprocessor 44 coupled between signal detector 43 and message center 30. Microprocessor 44 is provided in receiver 40b to provide a more intelligent interface to message center 30 and to enable verification that the signal detected by signal detector 43 is originating from one of parameter sensor and transmitter circuits $20_0$–$20_n$ associated with the vehicle. To perform this verification, microprocessor 44 or other equivalent means, starts an internal timer upon the first indication that signal detector 43 has detected a signal, and determines whether the signal is continuously detected for at least a predetermined time period. This verification will insure that the detected signal was not originated by a parameter sensor and transmitter circuit located in a different vehicle which may be passing in closely adjacent relationship and, thus, otherwise trigger an alarm in the system of FIG. 5.

Figure 7:
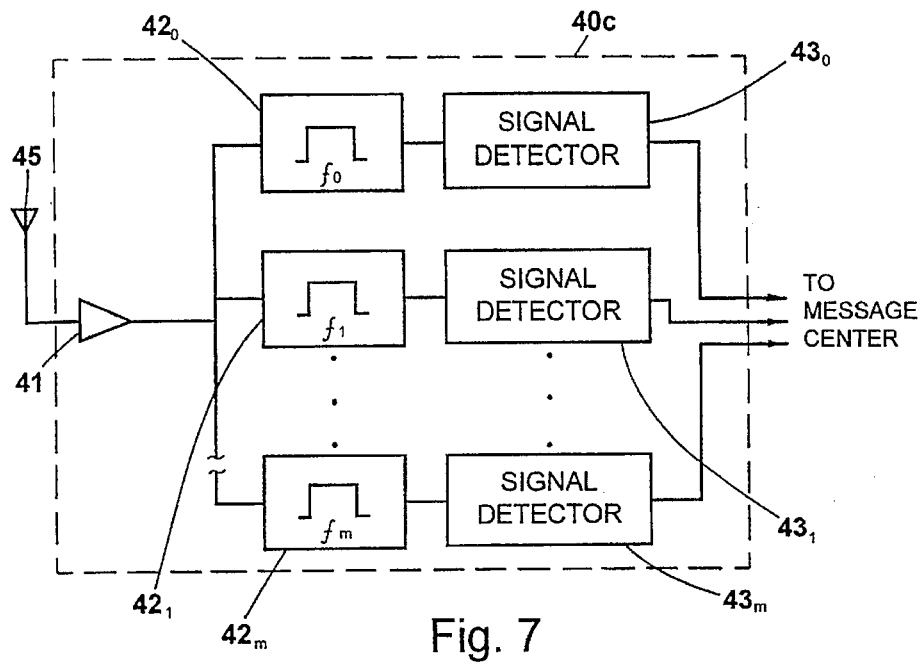
FIG. 7 is a block electrical circuit diagram of a receiver constructed in accordance with a third embodiment of the present invention.

FIG. 7 shows a receiver 40c constructed in accordance with a third embodiment of the present invention. Receiver 40c differs from receiver 40a shown in FIG. 5 in that the control circuit of receiver 40c includes a plurality of parallel bandpass filters $42_0$–$42_n$, each connected to an associated signal detector $43_0$$43_n$. Each of bandpass fillers $42_0$–$42_n$ preferably have bandwidths of 2Δf centered about different respective nominal frequencies $f_0$–$f_n$. Receiver 40c is constructed to accommodate a plurality of parameter sensor and transmitter circuits $20_0$–$20_n$ (FIG. 1), each transmitting at different frequency ranges about nominal frequencies $f_0$–$f_n$. Although the number of bandpass filters m will typically be equal to the number of parameter sensor and transmitter circuits n, it may be preferable in some circumstances that the numbers would not be equal. For example, if four of parameter sensor and transmitter circuits $20_0$–$20_3$ are used in the vehicle's tires, which transmit within frequency ranges centered about the same nominal frequency, and additional parameter sensor and transmitter circuits $20_4$–$20_1$, which transmit within frequency ranges centered about different nominal frequencies, are used to monitor additional parameters, then one bandpass filter may be used in association with the four tire pressure sensors, while additional bandpass filters may be used in association with the additional parameter sensor and transmitter circuits.

By providing a plurality of bandpass filters $42_0$–$42_n$, receiver 40c may provide output signals to message center 30 that identify a particular sensed parameter based upon the detected frequency of the received RF signal. Thus, when utilized with parameter sensor and transmitter circuits $20_0$–$20_n$ that are used as tire pressure sensors, which transmit in frequency ranges centered about different nominal frequencies, receiver 40c may identify each particular one, if any, of the vehicle's tires that is low in pressure.

Figure 8:
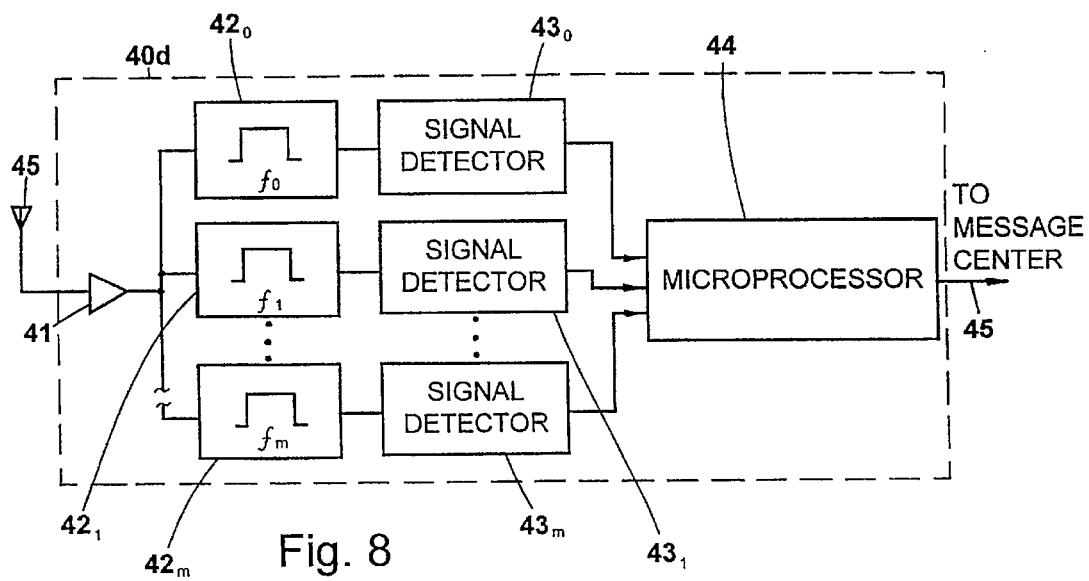
FIG. 8 is a block electrical circuit diagram of a receiver constructed in accordance with a fourth embodiment of the present invention.

FIG. 8 shows a receiver 40d constructed in accordance with a fourth embodiment of the present invention. Receiver 40d differs from receiver 40c shown in FIG. 7 in that the control circuit of receiver 40d additionally includes a microprocessor 44 connected between signal detectors $43_0$–$43_n$ and message center 30. In addition to providing the ability to verify the signals detected by signal detectors $43_0$–$43_n$, microprocessor 44 may also provide an interface to message center 30. In this manner, microprocessor 44 may distinguish which of signal detectors $43_0$–$43_n$ is providing an output indicative of a detected signal and may encode a message in a conventional manner to deliver over an existent vehicle data bus 45 to be received and displayed by message center 30. Thus, in this embodiment the wiring between the receiver and the message center may be reduced.

Figure 9:
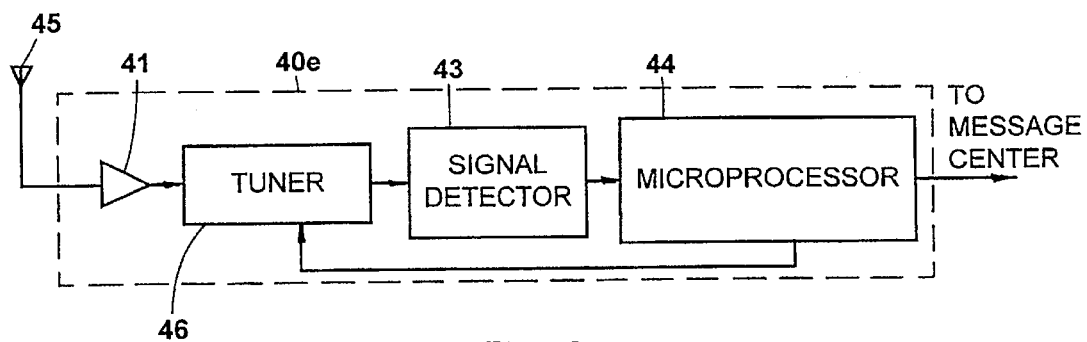
FIG. 9 is a block electrical circuit diagram of a receiver constructed in accordance with a fifth embodiment of the present invention.
Figure 11:
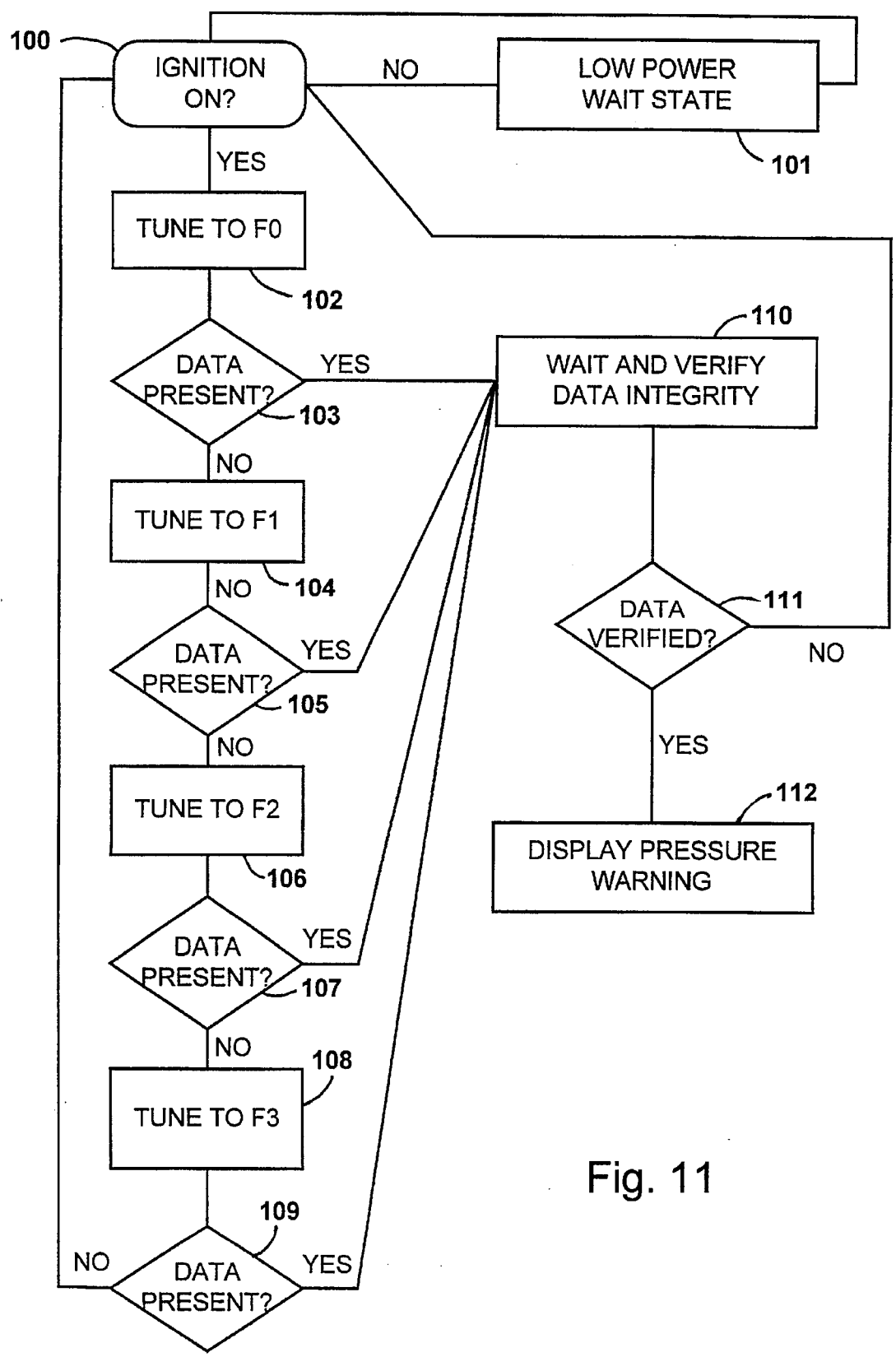
FIG. 11 is a flow diagram of the programming of the microprocessor utilized in the receivers constructed in accordance with the fifth and sixth embodiments of the present invention.

FIG. 9 shows a receiver 40e constructed in accordance with a fifth embodiment of the present invention. Receiver 40e differs from receiver 40d shown in FIG. 8 in that the parallel combinations of bandpass filters and signal detectors are replaced with a single heterodyne tuner 46 and a single signal detector 43 connected between RF amplifier 41 and microprocessor 44. Heterodyne tuner 46 is employed to scan through the predetermined ranges of frequencies that may be output by parameter sensor and transmitter circuits $20_0$–$20_n$ under the control of microprocessor 44. The operational steps performed by microprocessor 44 will now be discussed with reference to the program flow diagram of FIG. 11.

Initially, microprocessor 44 determines whether the vehicle ignition is turned on (step 100). If the vehicle ignition is not turned on, microprocessor 44 enters a low power wait state (step 101) until microprocessor 44 determines that the vehicle ignition has been turned on (step 100). After determining that the vehicle ignition has been turned on, microprocessor 44 controls heterodyne tuner to tune to a first nominal frequency $f_0$ (step 102). Next, microprocessor 44 determines whether a signal is present at frequency $f_0$ (step 103). If microprocessor 44 determines that a signal is not present, microprocessor 44 controls heterodyne tuner 46 to tune to a second nominal frequency $f_1$ (step 104) and determines whether a signal is present at this frequency $f_1$ (step 105). If a signal is not detected, microprocessor 44 controls heterodyne tuner 46 to tune to a third nominal frequency $f_2$ (step 106) and determine whether a signal is present at this frequency (step 107). If no signal is present at frequency $f_2$, microprocessor 44 controls heterodyne tuner 46 to tune to a fourth nominal frequency $f_3$ (step 108) and determine whether a signal is present at this frequency (step 109). If no signal is detected at frequency $f_3$ and there are no other predetermined frequencies at which parameter sensor and transmitter circuits $20_0$–$20_n$ transmit, microprocessor 44 again determines whether the vehicle ignition is turned on (step 100) and repeats a scan of the predetermined nominal frequencies $f_0$–$f_3$ until a signal is detected at one of these frequencies. If additional nominal frequencies are transmitted by parameter sensor and transmitter circuits $20_0$–$20_n$, microprocessor 44 will control heterodyne tuner 46 to scan through these additional frequencies until a signal is detected.

When microprocessor 44 determines that a signal is present for one of the predefined nominal frequencies $f_0$–$f_1$ (steps 103, 105, 109, and 109), microprocessor 44 initiates an internal timer and waits for a predetermined period of time to verify data integrity by insuring that the detected signal is present for the predetermined period of time (step 110). Next, if the detected signal is verified (step 111), microprocessor 44 outputs a message to message center 30 (step 112) indicating which message to display or which indicator light or audible alarm to activate in order to warn the vehicle driver of an abnormal condition associated with a particular sensed parameter. If microprocessor 44 cannot verify the detected signal (step 111), microprocessor 44 again determines whether the vehicle ignition is turned on (step 100) and resumes scanning each one of the discrete predetermined nominal frequencies $f_0$–$f_3$.

When a parameter sensor and transmitter circuit such as that shown in FIG. 2 and a receiver such as that shown in FIG. 9 are used in vehicle parameter monitoring system 10 of the present invention, microprocessor 44 of receiver 40e may generate a message indicative of the severity of a sensed abnormal condition. For example, when used in a tire pressure monitoring system in which the frequency of the RF signal generated by VCO 22 is proportional to the sensed pressure of the tire, microprocessor 44 may control heterodyne tuner 46 to determine the variance of the detected frequencies from the frequency that represents adequate tire pressure. In this manner, microprocessor 44 may determine the relative tire pressure for each tire and generate a message indicating the respective sensed tire pressure.

Figure 10:
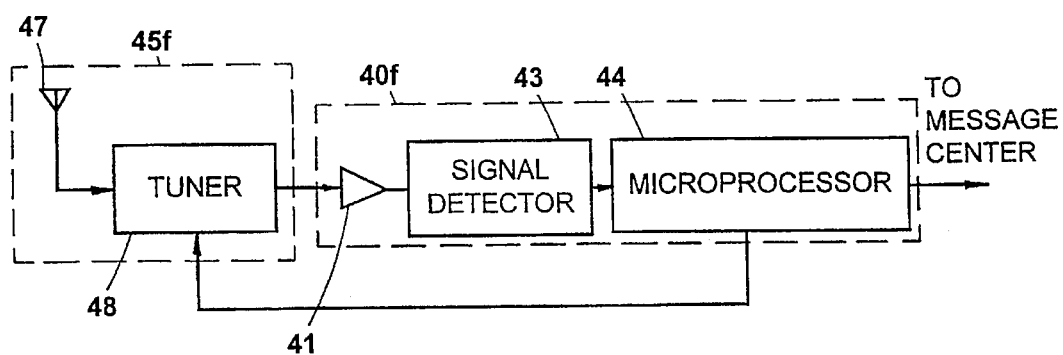
FIG. 10 is a block electrical circuit diagram of a receiver constructed in accordance with a sixth embodiment of the present invention.

FIG. 10 shows a receiver 40f and an antenna system 45f constructed in accordance with a sixth embodiment of the present invention. Antenna system 45f and receiver 40f differ from antenna 45 and receiver 40e shown in FIG. 9 in that heterodyne tuner 46 is replaced with an antenna tuning circuit 48 connected between a loop antenna 47 and RF amplifier 41. Antenna tuner 48 is used to vary the impedance of loop antenna 47 under the control of microprocessor 44 such that the RF signals received by RF amplifier 41 are tuned within predetermined ranges of frequencies. Antenna tuner 48 may include a varactor diode having a capacitance which varies in accordance with an analog control signal converted by an internal D/A converter from digital control signals provided by microprocessor 44.

Although receiver 40 is discussed above as a dedicated receiver for a parameter monitoring system, receiver 40 could be implemented in a receiver for an RF remote keyless entry system. In such an implementation, microprocessor 44 tunes to the carrier frequency of a remote keyless entry transmitter when the ignition is off and scans through the frequencies transmitted by the parameter sensor and transmitter circuits when the ignition is on.

Figure 12:
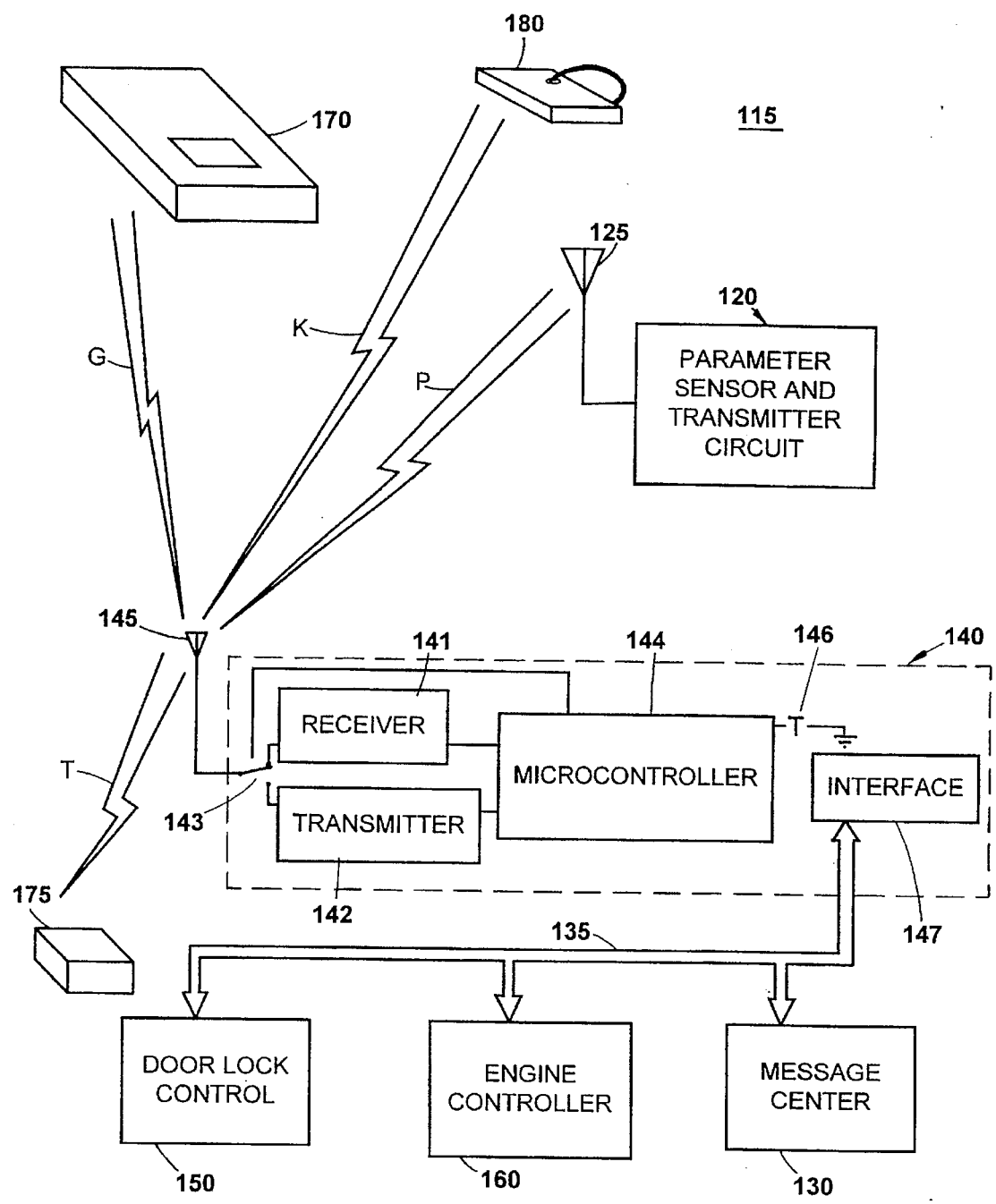
FIG. 12 is a block electrical circuit diagram of the wireless vehicle parameter monitoring system constructed in accordance with a seventh embodiment of the present invention.

FIG. 12 shows a vehicle parameter monitoring system 115 constructed in accordance with a seventh embodiment of the present invention. Vehicle parameter monitoring system 115 includes at least one parameter sensor and transmitter circuit 120 having an antenna 125, a trainable transmitter 140, and a message center 130 connected to trainable transmitter 140 by a vehicle system bus 135.

Trainable transmitter is preferably the HOMELINK™ trainable transmitter commercially available from Prince Corporation of Holland, Mich. Such trainable transmitters include a receiver 141, a transmitter 142, a transmit/receive switch 143, a microcontroller 144, an antenna 145, at least one actuator switch 146, and a vehicle system bus interface 147. Trainable transmitter 140 operates in either a training mode or an operational mode. As a default condition, trainable transmitter 140 is in an operational mode until the training mode is entered by depressing actuator switch 146 for more than a predetermined time interval. Although trainable transmitter 140 is described with respect to one actuator switch 146, a plurality of actuator switches may be provided where each actuator switch is associated with a different channel for which trainable transmitter 140 may transmit a learned RF signal.

During a training mode, microcontroller 144 causes transmit/receive switch 143 to connect receiver 141 to antenna 145 to receive an RF signal G from a garage door opener remote transmitter 170 or the like. To identify the carrier frequency of the received RF signal G and separate and store the transmitted data code, microcontroller 144 controls a voltage controlled oscillator (VCO) in transmitter portion 142 to generate a reference RF signal that is mixed with the received RF signal G. The resulting mixed signal is provided to a bandpass filter that passes a demodulated signal through to microcontroller 144 when the difference between the frequency of the reference RF signal and the carrier frequency of the received RF signal G is 3 MHz. Microcontroller 144 controls the VCO to increment the frequency of the reference RF signal by 1 MHz until microcontroller 144 detects and verifies the presence of data. Next, microcontroller 144 verifies the carrier frequency of RF signal G by increasing the frequency of the reference RF signal by 3 MHz to determine if the data is no longer present, and then increasing the frequency of reference RF signal by another 3 MHz to determine if the data can again be detected. After verifying the carrier frequency of RF signal G, microcontroller 144 stores carrier frequency and the data code of the RF signal G and notifies the user of a successful train.

Upon brief actuation of actuator switch 146 in the operational mode, trainable transmitter 140 transmits an RF signal T having the same carrier frequency, data format, and data code as the modulated RF signal G received and learned from garage door opener remote transmitter 170 in order to actuate a garage door opener 175. To perform this operation, microcontroller 144 controls transmit/receive switch 143 to connect transmitter portion 142 to antenna 143, reads the carrier frequency from memory, controls the VCO to output an RF signal having the carrier frequency stored in memory, and modulates the RF signal output by the VCO using the stored modulation information including the data code.

Trainable transmitter 140 additionally may be used to receive RF signals K from one or more remote keyless entry (RKE) transmitters 180 and cause at least one of the vehicle's doors to lock or unlock in response to such RF signals. In the operational mode, microcontroller 144 controls transmit/receive switch 143 to connect receiver portion 141 with antenna 145 and determines whether the vehicle's ignition is on or off. If the vehicle's ignition is off, microcontroller 144 periodically checks whether an RF signal K has been received from RKE transmitter 180. To determine whether RF signal K has been received, microcontroller 144 sets the frequency of a reference RF signal output from the VCO in transmitter portion 142 3 MHz below the known carrier frequency of RF signal K such that data encoded in RF signal K can be detected by microcontroller 144. Next, microcontroller 144 compares the received data to the predetermined data code associated with RKE transmitter 180 and provides an appropriate command to door lock controller 150 through interface 147 and vehicle system bus 135 after determining that the received data code is the same as that previously stored in microcontroller 144.

To implement the vehicle parameter monitoring system of the present invention using such a trainable transmitter, microcontroller 144 is programmed to look for RF signals P transmitted from the parameter sensor and transmitter circuits 120. When microcontroller 144 determines that the vehicle ignition is turned on during the operational mode, microcontroller 144 is programmed to examine the known frequency ranges of RF signals P that may be output from parameter sensor and transmitter circuits 120 by providing appropriate control signals to receiver 141 tuning the receiver in a manner similar to that disclosed by the programing of FIG. 11.

Upon detecting the presence of an RF signal P transmitted within the known frequency ranges, microcontroller 144 could optionally make slight adjustments to the reference RF signal generated by the VCO in transmitter portion 142 to more precisely identify the frequency of the received RF signal P. By precisely identifying the carrier frequency of the received RF signal P, microcontroller 144 determines the corresponding tire pressure. Next, microcontroller 144 compares the tire pressure with a threshold level. If the tire pressure is below the threshold level, microcontroller 144 provides a message to an engine controller 160 through interface 147 and vehicle system bus 135 in order to govern the speed of the vehicle. In this manner, vehicle parameter monitoring system 115 would not only warn the vehicle operator of the dangerous condition, but also prevents the operator from driving at an unsafe speed.

By utilizing the receiver circuitry of a trainable transmitter 140, an additional dedicated RF receiver in a vehicle utilizing such a trainable transmitter is unnecessary to monitor vehicle parameters. Thus, the cost of providing a parameter monitoring system in a vehicle may be further reduced.

Although the present invention has been described as being useful for monitoring tire pressure, the wireless vehicle parameter monitoring system may be used to monitor any other vehicle parameters such as fuel level, engine temperature, oil pressure, battery voltage, and the like. Further, the nominal frequencies and bandwidths of the bandpass filters may be selected such that the parameter level at which a warning is to be provided may be modified. For example, the uppermost frequency $f_{NOM} + \Delta f$ at which a warning signal is generated may be altered to a frequency representing a more severe condition so that a driver is not warned when the tire pressure is only slightly below normal.

The above described embodiments were chosen for purposes of describing but one application of the present invention. It will be understood by those who practice the invention and by those skilled in the art, that various modifications and improvements may be made to the invention without departing from the spirit or scope of the invention as defined by the appended claims.

The embodiments of the invention in which an exclusive property or privilege is claimed are defined as follows:

1. A vehicle parameter system comprising:
   at least one parameter sensor for sensing a condition of a vehicle parameter;
   at least one transmitter coupled to said parameter sensor for transmitting a radio frequency signal having a carrier frequency that is varied in relation to the sensed condition of the vehicle parameter; and
   a receiver for receiving the radio frequency signal, said receiver including a control circuit for detecting the carrier frequency of the received radio frequency signal and for selecting and generating a message signal based upon the detected carrier frequency of the received radio frequency signal.

2. The system as defined in claim 1, wherein said parameter sensor is a pressure sensor located in a tire.

3. The system as defined in claim 1, wherein the carrier frequency of the radio frequency signal transmitted by said transmitter varies in proportion to changes in the condition of the parameter as sensed by said parameter sensor.

4. The system as defined in claim 1 including a plurality of parameter sensors, and a plurality of transmitters, each of said transmitters transmitting a radio frequency signal having a different carrier frequency from the radio frequency signals transmitted by the other transmitters, and said control circuit determines which parameter of the vehicle a received radio frequency signal corresponds to based upon the detected carrier frequency of a received radio frequency signal.

5. The system as defined in claim 4, wherein the message signal selected and generated by said control circuit indicates to which parameter the message signal corresponds.

6. The system as defined in claim 1, wherein said receiver receives an additional radio frequency signal from a remote keyless entry transmitter, and said control circuit locks and unlocks at least one door of the vehicle in response to the receipt of the additional radio frequency signal.

7. The system as defined in claim 1 and further including a message center coupled to said control circuit for generating and providing a message to a vehicle operator in response to a message signal received from said control circuit.

8. The system as defined in claim 1, wherein said parameter sensor is a pressure-to-voltage transducer, which supplies a voltage proportional to the pressure of a tire.

9. The system as defined in claim 8, wherein said transmitter includes a voltage controlled oscillator coupled to said pressure-to-voltage transducer for generating a radio frequency signal having a carrier frequency that varies in proportion with the voltage from said pressure-to-voltage transducer.

10. The system as defined in claim 1, wherein said control circuit includes:
    a signal detector for detecting a presence of the received radio frequency signal; and
    a microprocessor coupled to said signal detector for selecting a message signal based upon a carrier frequency of the received radio frequency signal and generating the selected message signal in response to the detected presence of the received radio frequency signal by said signal detector.

11. The system as defined in claim 10, wherein said receiver further includes a tuner coupled to said signal detector for selectively tuning to a predetermined set of discrete carrier frequencies.

12. The system as defined in claim 11, wherein said microprocessor is coupled to said tuner for controlling said tuner to sequentially scan through said predetermined set of carrier frequencies until said signal detector detects the presence of a radio frequency signal, and for selecting a message signal based upon the carrier frequency to which said tuner is tuned when said signal generator detects the presence of a radio frequency signal.

13. The system as defined in claim 1, wherein said parameter sensor is a pressure sensor located in a tire and said control circuit is coupled to a system bus of the vehicle to govern the speed of the vehicle when the sensed tire pressure falls below a predetermined level.

14. The system as defined in claim 1, wherein said receiver is the receiving portion of a trainable transmitter.

15. A vehicle parameter monitoring system comprising:
    at least one parameter sensor;
    at least one transmitter coupled to said parameter sensor for transmitting a first radio frequency signal;
    a receiver for receiving said first radio frequency signal when in an operational mode and, when in a training mode for receiving a second radio frequency signal transmitted by a remote transmitter used to actuate a device;
    a signal detector coupled to said receiver for detecting a presence of said received first radio frequency signal;
    a controller coupled to said receiver and said signal detector, for selecting and generating a warning signal in an operational mode in response to said first radio frequency signal, and identifying and storing the carrier frequency, data format, and data code of a second radio frequency signal in a training mode; and
    a transmitter coupled to said controller for transmitting a third radio frequency signal having the carrier frequency, data format, and data code of said second radio frequency signal to remotely actuate the device.

16. The system as defined in claim 15, wherein said parameter sensor is a pressure sensor located in a tire.

17. The system as defined in claim 15, wherein said receiver further includes a tuner coupled to said signal detector for selectively tuning in a predetermined set of carrier frequencies.

18. The system as defined in claim 17, wherein said control circuit is coupled to said tuner and said signal detector for controlling said tuner, when in the operational mode, to sequentially scan through said predetermined set of carrier frequencies until said signal detector detects the presence of a radio frequency signal, and for selecting a warning signal based upon the carrier frequency to which said tuner is tuned when said signal generator detects the presence of a radio frequency signal.

19. The system as defined in claim 15, wherein said receiver receives an additional radio frequency signal from a remote keyless entry transmitter, and said control circuit locks and unlocks at least one door of the vehicle in response to the receipt of the additional radio frequency signal.

20. A vehicle parameter monitoring system comprising:
a plurality of parameter sensors, each for sensing one of a plurality of monitored parameters;
a plurality of transmitters each coupled to a corresponding one of said parameter sensors, for transmitting a radio frequency signal having a carrier frequency uniquely associated with the corresponding one of said parameter sensors; and
a receiver for receiving the radio frequency signals, said receiver including at least one signal detector for detecting a presence of a received radio frequency signal, and a microprocessor, coupled to said signal detector for selecting a warning signal based upon carrier frequency of the received radio frequency signal and generating the selected warning signal in response to the detected presence of the received radio frequency signal by said signal detector to identify the status of a particular sensor.

21. The system as defined in claim 20, wherein said plurality of parameter sensors include a plurality of pressure sensors, each located in a tire of the vehicle.

22. The system as defined in claim 20, wherein said receiver further includes a tuner coupled to said signal detector for selectively tuning in a predetermined set of carrier frequencies.

23. The system as defined in claim 22, wherein said microprocessor is coupled to said tuner and said signal detector, for controlling said tuner to sequentially scan through said predetermined set of carrier frequencies until said signal detector detects the presence of a radio frequency signal, and for selecting a warning signal based upon the carrier frequency to which said tuner is tuned when said signal generator detects the presence of a radio frequency signal.

24. The system as defined in claim 20, wherein said receiver further includes a plurality of bandpass filters coupled in parallel, wherein said at least one signal detector includes a plurality of signal detectors, each coupled between said microprocessor and a corresponding one of said plurality of bandpass filters, each of said plurality of bandpass filters block all received radio frequency signals from the corresponding one of said plurality of signal detectors except for received radio frequency signals having carrier frequencies corresponding to the different carrier frequencies of the radio frequency signals transmitted from said plurality of transmitters when a detected parameter level is abnormal.

25. The system as defined in claim 24, wherein said microprocessor is coupled to said plurality of signal detectors, for selecting a warning signal based upon which of said plurality of signal detectors detected a radio frequency signal.

26. A tire pressure monitoring system for a vehicle comprising:
at least one pressure sensor located in a tire of a vehicle;
at least one transmitter located in the tire and coupled to said pressure sensor for transmitting a radio frequency signal having a carrier frequency that is varied in relation to the sensed tire pressure; and
a receiver for receiving the radio frequency signal, said receiver including a control circuit for detecting the carrier frequency of the received radio frequency signal and for selecting and generating a message signal based upon the detected carrier frequency of the received radio frequency signal.

27. The system as defined in claim 26, wherein said transmitter varies the carrier frequency of the transmitted radio frequency signal in proportion with a tire pressure sensed by said pressure sensor.

28. The system as defined in claim 26, wherein said at least one pressure sensor includes a plurality of pressure sensors, said at least one transmitter includes a plurality of transmitters, each of said transmitters transmitting a radio frequency signal having a different carrier frequency from the radio frequency signals transmitted by the other transmitters; and said control circuit determines which tire of the vehicle a received radio frequency signal was transmitted from based upon the detected carrier frequency of a received radio frequency signal.

29. The system as defined in claim 28, wherein the message signal selected and generated by said control circuit indicates to which tire the message signal corresponds.

30. The system as defined in claim 26, wherein said receiver receives an additional radio frequency signal from a remote keyless entry transmitter, and said control circuit locks and unlocks at least one door of the vehicle in response to the receipt of the additional radio frequency signal.

31. The system as defined in claim 26 and further including a message center coupled to said control circuit for generating and providing a message to a vehicle operator in response to a message signal received from said control circuit.

32. The system as defined in claim 26, wherein said pressure sensor is a pressure-to-voltage transducer, which outputs a voltage proportional to the pressure of the tire.

33. The system as defined in claim 32, wherein said transmitter includes a voltage controlled oscillator coupled to said pressure-to-voltage transducer for generating a radio frequency signal having a carrier frequency that varies in proportion with the voltage output by said pressure-to-voltage transducer.

34. The system as defined in claim 26, wherein said control circuit includes:
a signal detector for detecting a presence of the received radio frequency signal; and
a microprocessor coupled to said signal detector for selecting a message signal based upon a carrier frequency of the received radio frequency signal and generating the selected message signal in response to the detected presence of the received radio frequency signal by said signal detector.

35. The system as defined in claim 34, wherein said receiver further includes a tuner coupled to said signal detector for selectively tuning in a predetermined set of carrier frequencies.

36. The system as defined in claim 35, wherein said microprocessor is coupled to said tuner for controlling said tuner to sequentially scan through said predetermined set of carrier frequencies until said signal detector detects the presence of a radio frequency signal, and for selecting a message signal based upon the carrier frequency to which said tuner is tuned when said signal generator detects the presence of a radio frequency signal.

37. The system as defined in claim 34, wherein said control circuit further includes a bandpass filter coupled to said signal detector, for blocking all received radio frequency signals from said signal detector except for received radio frequency signals having a carrier frequency corresponding to a carrier frequency of the radio frequency signal transmitted from said at least one transmitter.

38. The system as defined in claim 34, wherein said control circuit is coupled to a system bus of the vehicle to govern the speed of the vehicle when the sensed tire pressure falls below a predetermined level.

39. The system as defined in claim 34, wherein said receiver is the receiving portion of a trainable transmitter.

40. The system as defined in claim 34, wherein said microcontroller starts a timer upon a first indication that said signal detector has detected the presence of the received radio frequency signal, and determines whether the signal is continuously detected for at least a predetermined period of time before generating the selected message signal.

41. A vehicle tire pressure monitoring system comprising:

at least one tire pressure sensor located in a tire of a vehicle;

at least one transmitter coupled to said tire pressure sensor for transmitting a signal representing the pressure sensed by said tire pressure sensor; and a control circuit coupled to a system bus of the vehicle for receiving the signal transmitted from said transmitter and determining the pressure sensed by said tire pressure sensor based upon the received signal and for governing the speed of the vehicle when the sensed tire pressure reaches a predetermined level.

42. The system as defined in claim 41, wherein said receiver is a receiver of a trainable transmitter.

43. The system as defined in claim 41, and further including a receiver coupled to said control circuit, wherein said signal transmitted by said transmitter is a radio frequency signal.

44. A vehicle parameter monitoring system comprising:

at least one parameter sensor for sensing a condition of a vehicle parameter;

at least one transmitter coupled to said parameter sensor for transmitting a signal having a carrier frequency that is varied in relation to the sensed condition of the vehicle parameter; and a receiver for receiving the signal, said receiver including a control circuit for detecting the carrier frequency of the received signal, starting a timer upon a first detection of the received signal, determining whether the signal is continuously detected for at least a predetermined period of time, and for selecting and generating a message signal based upon the detected carrier frequency of the received radio frequency signal when the signal is continuously detected for at least the predetermined period of time.

\* \* \* \* \*